Figure 2:
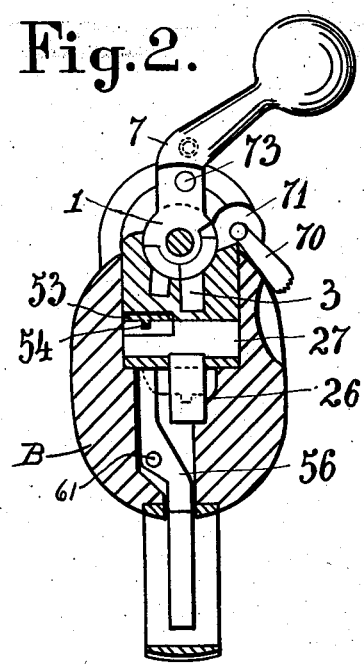

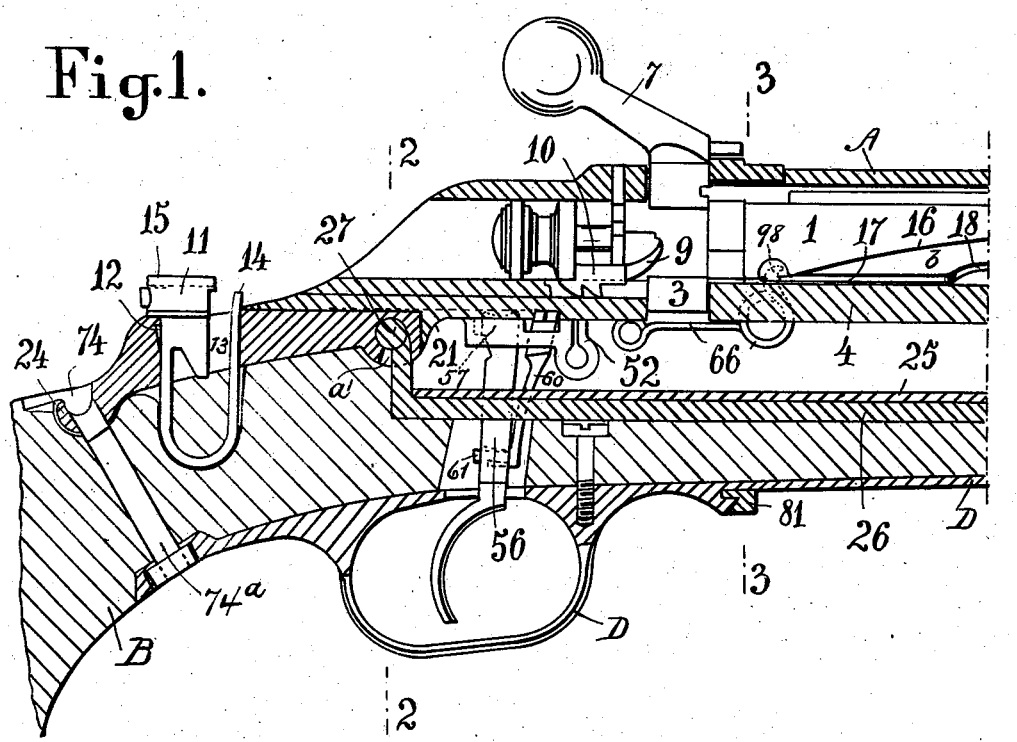
Fig. 1.
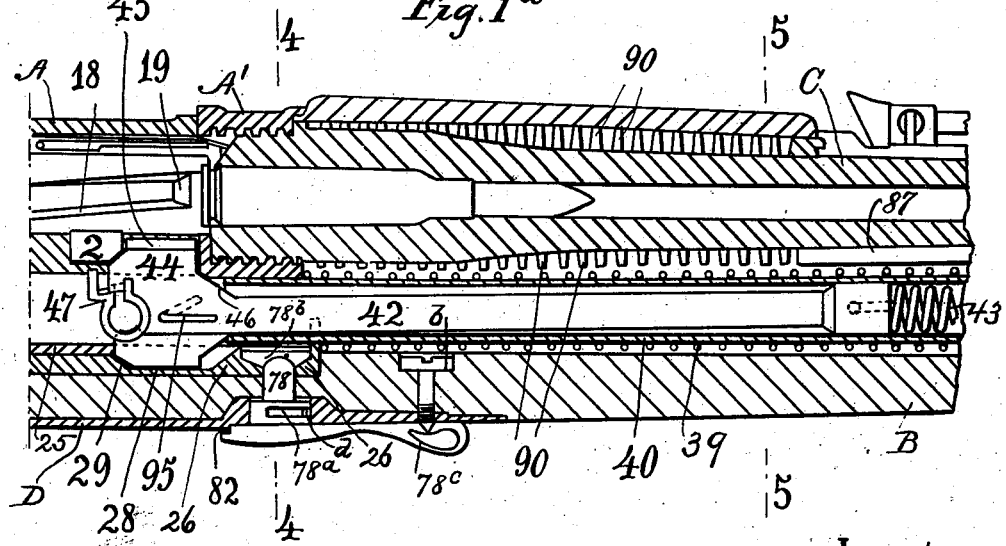
Fig. 1ª

H. SUNNGARD.
RIFLE.
APPLICATION FILED AUG. 5, 1908.

952,765.

Patented Mar. 22, 1910.
4 SHEETS—SHEET 2.

Witnesses.
Jess N. Lutton.
B. Sommers.

Inventor.
Harald Sunngard
by Henry Orth
atty.

H. SUNNGARD.
RIFLE.
APPLICATION FILED AUG. 5, 1908.
952,765.
Patented Mar. 22, 1910.
4 SHEETS—SHEET 3.
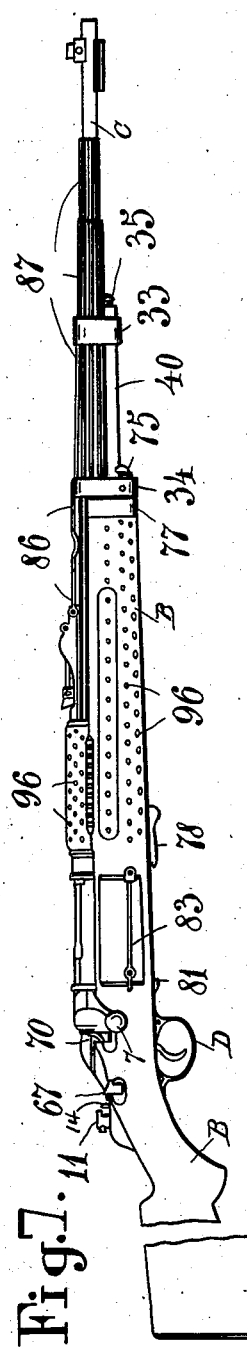
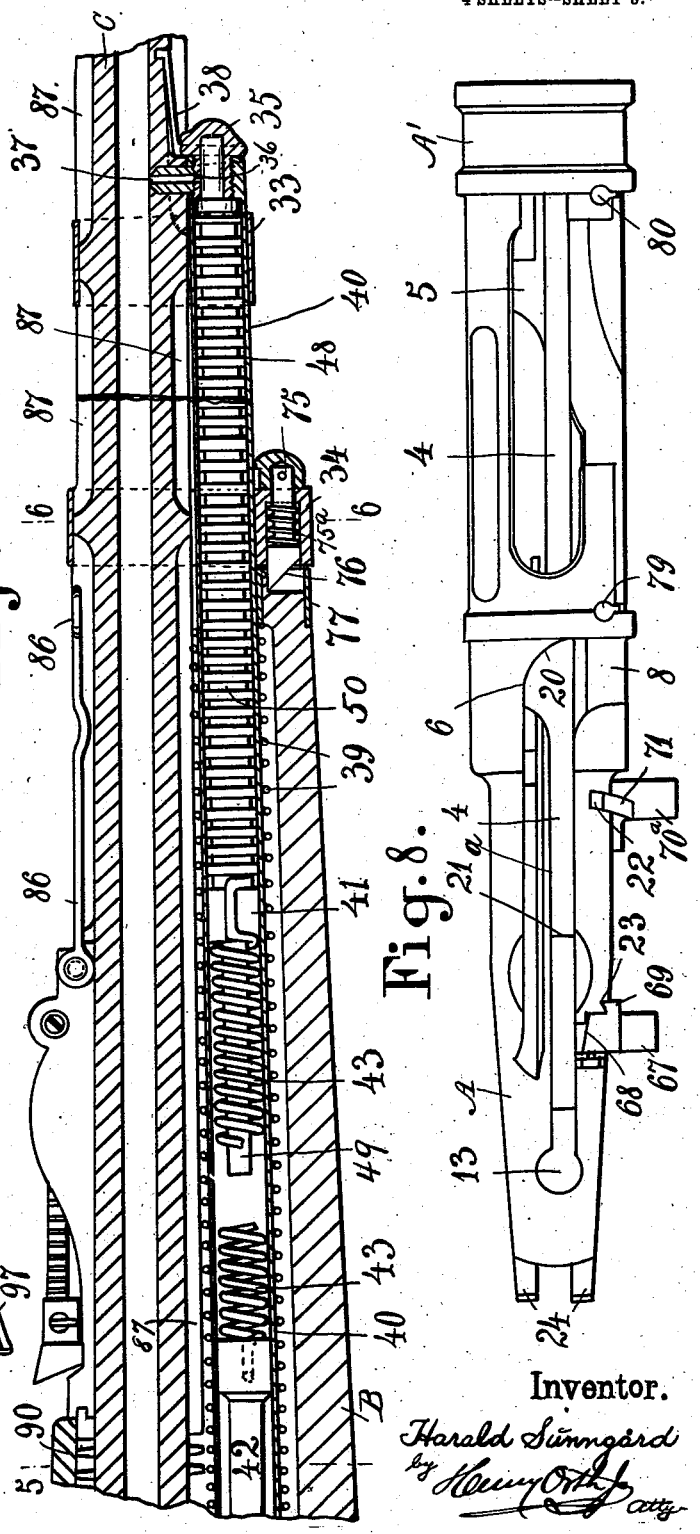
Witnesses.
Inventor.
Harald Sunngård

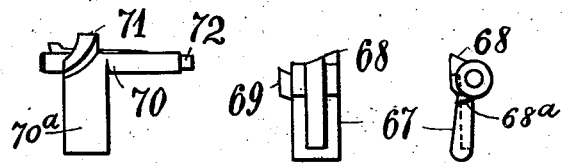
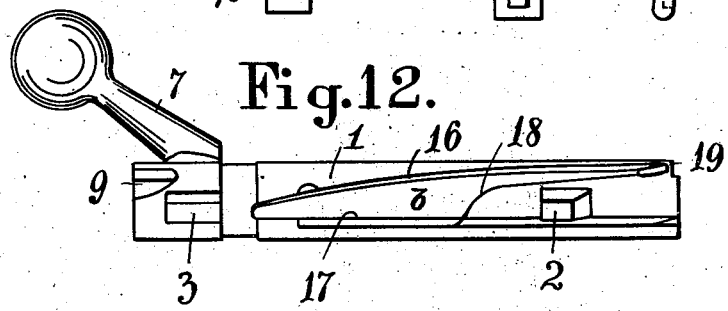
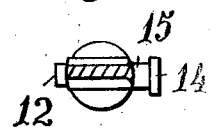
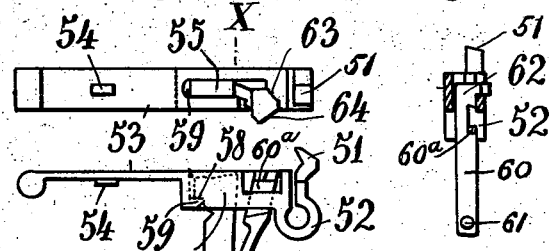
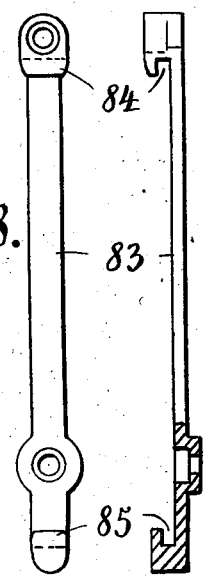

UNITED STATES PATENT OFFICE.

HARALD SUNNGÅRD, OF CHRISTIANIA, NORWAY.

RIFLE.

952,765.

Specification of Letters Patent.   Patented Mar. 22, 1910.

Application filed August 5, 1908.   Serial No. 447,131.

*To all whom it may concern:*

Be it known that I, HARALD SUNNGÅRD, a subject of the King of Norway, residing at Christiania, Norway, have invented certain new and useful Improvements in Rifles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to rifles of the kind, in which, by means of a piston mounted in a tube below the barrel, part of the pressure of the powder gases can be utilized to automatically operate the reloading mechanism, and the object of the invention contemplates, besides a general simplification of the mechanism, certain new dispositions and arrangements for making rifles of this type equally adapted for hand operation and thereby sufficiently reliable and efficient for war purposes.

The chief characteristic feature of the present invention lies in the arrangement by which the piston mechanism acted upon by the powder gases and, during automatic firing, actuating the breech in the manner hereinafter described, is enabled to enter into a position of rest, where it is entirely out of engagement with the opening and locking surfaces of the breech bolt. The latter is thus not prevented from being operated direct by hand by means of its fixed knob lever like ordinary military rifles on the insertion of the first cartridge, as in cases where the cartridge cases on account of irregular size or accumulating impurities fit too tight or stick altogether and where the automatic mechanism has become damaged, or where automatic loading is not on the whole desirable the gas admission passage having been closed.

The present device thus renders it possible to conserve and utilize, in an automatic arm, the well-known sliding and turnable breech bolt with fixed knob lever of the present military rifles, and to profit by the advantage it offers of a combined lever and screw-action for the insertion or extraction of tight-fitting or sticking cartridge cases.

Further characteristic features of my invention lie in the practical provision of buffer springs, softening the stroke of the automatic mechanism and of the turnbolt, in the arrangement of a trigger device automatically arresting the firing pin for every round; in the arrangement for automatically arresting the breech bolt in its rearmost position for semi-automatic operation; in the arrangements by which the piston is exempted from any choking influences arising from intruding impurities or rust, in the provision of ample cooling surfaces etc., as more particularly set forth in the following detailed description, all of which features largely contribute to render the rifle reliable and particularly adapted for military purposes.

A form of rifle embodying the present invention is illustrated in the annexed drawings, in which—

Figure 20:
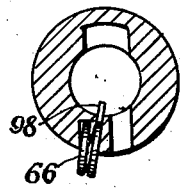
Figure 19:
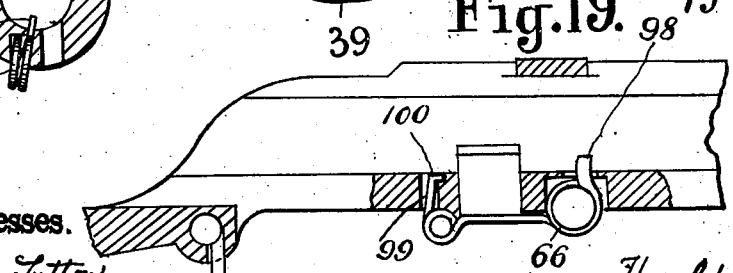

Figure 1 is an axial longitudinal vertical sectional view of the breech of the rifle with the breech-bolt turned up by hand. Fig. 1$^a$ is a continuation of Fig. 1. Figs. 2-6 are cross sections on the lines 2—2 to 6—6 respectively of Figs. 1, 1$^a$ and 9. Fig. 7 is a side view of the entire rifle. Fig. 8 is a plan view of the breech casing. Fig. 9 is a continuation of Fig. 1$^a$. Fig. 10 is a detail side view of the safety member. Fig. 11 shows the stopping cock in side and rear elevation respectively. Fig. 12 is a bottom view of the breech bolt. Fig. 13 is a top view of the stopping pin. Figs. 14 and 15 are plan and side views of the trigger. Fig. 17 is a sectional view of the same on the line $x$—$x$ of Figs. 14 and 15. Fig. 16 is a similar view, the parts occupying a different position. Fig. 18 shows the bar for securing the magazine in side and end elevation respectively, the latter being partly in section. Fig. 19 is a detail view of the cartridge case ejector and Fig. 20 is a cross section of Fig. 19.

In view of the desire to create an automatic rifle that at the same time embodies the advantages of the ordinary hand-operated military rifles, I have in the main kept the form of breech used in the magazine rifles most commonly employed of later years. The cylindrical breech-bolt 1, (Figs. 1 and 12), is provided with a rigid lever 7 and has at its opposite ends two stopping lugs 2 and 3. The breech-bolt is movable and rotatable in a corresponding cylindrical bore in the breech casing A, the stopping lugs traveling during the reciprocating rectilinear movement in a bottom slot 4 Fig. 8, of the breech casing, and the lever 7 in a corresponding open slot $a$ in the upper side of the rear part of the breech casing. When the breech bolt in its foremost position is being rotated or turned to the right, the stopping lugs 2 and 3 enter grooves 5 and 6 respectively in the lower left side of the breech casing and the lever 7 enters the lateral slot 8 of the right side of said breech casing, thus locking and securing the breech-bolt in place in a thoroughly safe and reliable way. Further it will be seen, that in the same manner as in the old constructions a continuity is produced between the rectilinear and the rotating movements of the breech-bolt by the arrangement that toward the end of the forward movement of the bolt, the lever 7 has to glide along a curved or arc-shaped surface 20 forming the transition between the longitudinal slot $a$ and its side branch 8, whereby the rotating movement is being initiated, and at the same time there is produced thereby the well-known and very important screw-action on the breech-bolt on the insertion and extraction of the cartridges. The breech bolt further has a cocking surface 9 acting in the usual way on a lug 10 of the striker thereby partly cocking same when the breech-bolt is turned upward. The extractor is likewise of the ordinary type, not partaking in the rotation of the breech-bolt, but moving longitudinally in the same upper slot of the breech casing as the bolt lever.

To bring about an automatic operation of the breech-bolt, the latter is provided with a groove or recess $b$ having an inclined or helical side surface 16 with which a lug 45 formed on the head 44 of the piston rod 42 coöperates during its backward and forward movements in such a way as to cause the upward and downward rotation of the breech-bolt for respectively opening and locking it.

Referring to Figs. 1 and 12, to turn open the breech-bolt, the lug 45 on receding engages against the side surface 16 of the recess $b$ and as this surface is formed with an increasing pitch, the upward rotation of the bolt goes on quite slowly at the beginning, but afterward with increasing velocity. During this movement the loosening of the empty shell and the initial backward movement of the breech-bolt is promoted by the effect of the inertia of the bolt lever, the front part of which glides along the rounded surface 20 in the front part of its slot in the breech casing, in a manner similar to what takes place in the ordinary repeating rifles. At this point of the opening operation the rear end of the head 44 of the piston rod 42 or the spring 47 mounted on said head for cushioning the thrust, reaches the front of the rear stopping lug 3 of the breech-bolt, with the effect that the latter, without any resistance acting on it, is thrown violently back, until said rear stopping lug 3 of the breech-bolt butts against a buffer 14 (Figs. 1 and 13) of a stopping pin 11, detachably mounted in a slot 13 at the rear end of the breech casing. At the same time the velocity of the piston itself decreases in consequence of its inertia being spent in tightening its strong locking spiral spring 39, disposed around the gas receiving chamber or piston tube 40, said spring thus also tending to soften the final stroke of the piston-rod head 44 against the end 21 of the piston slot in the breech casing, which stroke may be softened still more by, as previously mentioned, securing a buffer spring 47 to the piston-rod head.

To render possible the differing decrease of velocity of the breech-bolt and of the piston, the lug 45 must be allowed a very long linear movement in the recess $b$ of the breech-bolt, which moreover is also necessary to enable the breech-bolt to move a comparatively long distance out of the rear end of the breech casing, this being the only way to give the breech casing the desirable strength, lightness and shape, while at the same time the weakening of the butt of the stock B by tapering the same too near the neck of the butt is avoided. Owing to the necessity of this long linear movement of the lug 45 in the recess $b$, the inclined closing or locking surface 18 which is opposite to the said opening surface 16 must be very short as compared with the latter, with the result that this closing surface 18 must be formed with a greater pitch and must form, especially at its rear end, a large angle with the longitudinal axis of the breech-bolt. The great distance arising herefrom between the opening surface 16 on one hand and the rectilinear surface 17 and the closing surface 18 on the other, is necessary in order that when the comparatively light breech-bolt has been thrown forward by the reaction of the strong buffer spring 14 of the stopping pin 11, and the bolt lever 7 engages the aforementioned rounded surface 20 in the breech-casing, the suddenly started downward rotation of the breech bolt may not be impeded by the lug 45 in the event that the spring of the piston should not have been able to move the piston forward and in order that no energy of motion may be lost, in consequence of the lug 45 engaging and gliding along the short, curved closing or locking surface 18 of the breech bolt until the downward rotation has been completed.

The principal characteristic features of the present invention consist, however, in the arrangements by which, after the breech-bolt has been automatically opened and closed, the piston mechanism acted upon by the powder gases and during automatic firing actuating the breech-bolt in the manner above described, is enabled to get into a position of rest, in which it is completely out of engagement with the opening and closing surfaces of the breech-bolt, thus not preventing the latter, which is provided with the usual hand lever 7, from being in a convenient, speedy and perfectly safe manner operated direct by hand on the insertion of the first cartridge, as in cases where the shells or cartridge cases on account of irregular size or accumulating impurities fit too tight or stick altogether, where the automatic mechanism has become damaged, or where automatic loading is not on the whole desirable and the gas admission passage has been closed. This is obtained in the present invention by allowing the piston—after the downward rotation of the breech-bolt has been completed—to move on a farther distance forward, so that the piston-rod-head 44 will get out of the path of the breech-bolt. When moving in the opposite direction the entering of said piston-rod head into the recessed portion between the opening and closing surfaces of the breech-bolt is being effected correspondingly. Said effect of disengaging the breech-bolt and piston rod head may be brought about in various ways, the first alternative of which is illustrated in the drawings, where the guide slot 25 of the piston-rod head is provided in its front end with a recess 28, into which the piston-rod head 44 is forced down, so as to bring its lug 45 out of the path of the breech-bolt. Referring to Fig. 1ª, the piston-rod head 44 is kept in its foremost, inactive position by the pressure of a strong closing spiral spring, 39, disposed around the gas tube and engaging the piston-rod head by a hook 95 formed on the rear end of said spring. During the backward and subsequent forward movement the piston-rod head is guided above by the bottom slot 4 of the breech-casing, Figs. 1 and 8, and below by the slot 25. This latter may be formed in a detachable guide-bar 26, Fig. 3, or in the lower portion of the breech-casing itself. As before mentioned, the guide slot 25 is provided in its front end with a recess 28, in which the piston-rod head rests in its inoperative position, but when—on firing the rifle—the piston 42 is thrown backward by the pressure of the powder gases, the piston-rod head 44 will mount the inclined plane 29 which connects the recess 28 and the slot 25, and consequently the top lug 45 of the piston-rod head will enter the recess b of the breech bolt, engage against the opening surface 16 of said recess b and thereby turn the breech-bolt open, throw it backward, subsequently bring it forward again and finally turn it down in consequence of the closing surface 18 in a manner already described. This completed, the piston-rod head 44 is automatically again brought down into the recess 28 in consequence of the inclined plane 19 limiting in front the recessed portion of the breech-bolt, and in consequence of the inclined plane 46 of the piston-rod head itself, which inclined plane engages against the under side of the breech casing. Besides in the manner illustrated in the drawing, where the depression or recess 28 is arranged in the detachable bar 26, it can of course also be arranged in the forward portion of the lateral faces of the upper guide slot 4. According to a second alternative, the same effect of automatically disengaging the breech-bolt and piston may be obtained through an arrangement in which the guide slot 4 of the piston-rod head in the breech casing near its foremost end deviates laterally, so that the piston-rod head, after having completed the downward rotation of the breech-bolt, during its continued forward movement is brought out of the path of the breech-bolt on account of the twisting movement of the piston-rod head arising from the said lateral deviation of the guide slot.— while during the backward movement of the piston the operation is reversed. According to a third alternative the same effect for making the breech-bolt fit for hand operation independent of the piston, may be obtained by giving the recess of the breech-bolt, in front of the ends of the opening and closing side surfaces, a lateral extension amounting to 90° and corresponding to the length of the piston lug, so that the upward (90°) rotation of the breech-bolt may be effected by hand without hindrance from the piston lug, although in this case, however, on pulling back the breech-bolt, the piston will have to partake of this movement. With the breech bolt in its downwardly turned locked position, the arrangement permits of free passage of the piston lug out and in between the opening and closing surfaces of the recess when the mechanism operates automatically.

The detachable guide bar is secured to the underside of the breech casing, and extends backward beyond the trigger, where it is hinged by a pivot cross-pin 27, Figs. 1 and 2, to the breech casing A, which for the reception of the cross-pin 27 has a corresponding transverse hole or bore a' partly slotted. At its forward end the bar 26 is attached to the casing by means of two spring arms 30, Fig. 4, having hooks 31 which, when the bar is pressed upward against the breech casing, enter corresponding notches provided in the sides of the casing, which is here of a cylindrical form. To remove or detach the bar it is only necessary to disengage the hooks 31 by the aid of a cartridge case or thin piece of metal. This lower guide bar may, as shown in the drawing, have a cross-sectional U-form, or it may have a cross section like an inverted T, in which latter case of course the corresponding lower portion of the piston-rod head must have a cross section like an inverted U.

Figure 4:
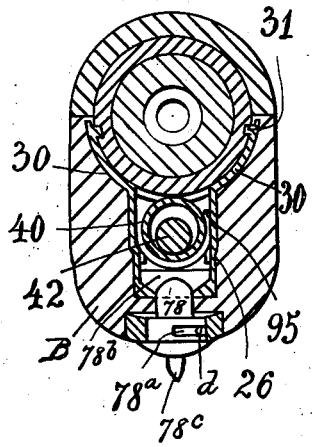
Figure 5:
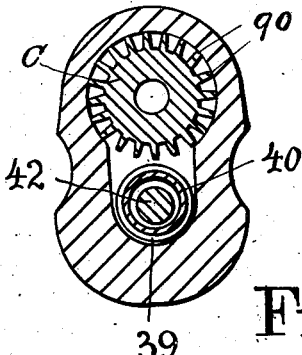
Figure 6:
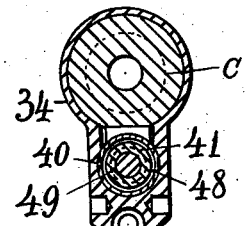

The piston rod 42 which carries the head 44 and effects the automatic loading is connected to the piston or plunger 41 as hereinafter described and is located in the tube 40, which has its foremost portion secured to the under-side of the barrel by two fixed bands or hoops 33 and 34, Figs. 6 and 9, and is clamped at the rear by the fore-end of the guide bar 26, Fig. 1ᵃ the tube being placed between the yielding arms of same as shown in Fig. 4. At its forward end, the tube 40 is provided with a hollow threaded screw plug 35, having a lateral boring 36 communicating with a gas exit passage 37 in the barrel C, by which arrangement the gas may be admitted to the tube or shut off from the same, thereby making the rifle operate automatically or non-automatically by simply turning by the fingers the plug 35, which is retained in its respective positions by a spring 38 engaging notches in the periphery of said plug. This screw-plug further offers the advantage, that its natural screw-thread renders any further tightening or stuffing-box arrangement superfluous, as is necessary for all similar cock, or valve, devices not provided with a screw-thread.

The piston rod 42 is retained in its foremost, inoperative position by the so-called closing or locking spiral spring 39, which embraces the piston tube 40 and has its fore end secured to the band or hoop 34, and its long, straight rear end is secured to the piston-rod head by the hook 95 thus serving to close or lock the mechanism.

The gas pressure arising during the firing of the rifle acts violently and extremely suddenly on the piston 41 and ceases before the upward rotation of the breech-bolt has commenced. In order to produce on one hand a softening of the violent stroke otherwise resulting and a gradual increase of velocity in the movement of the piston-rod head, and, on the other hand to extend the amount of time during which the inertia of the parts of the mechanism acted upon by the powder gases can be utilized, the piston mechanism has been arranged in two parts, the plunger 41, Fig. 9, and the piston-rod 42 with its head 44, which two parts are coupled together by an extremely stiff spiral spring 43, which is capable of acting as well by pressure as by tension. By this arrangement the piston-rod head is allowed to move freely up and down or to the side, at the same time as a somewhat inaccurate mounting of the piston tube 40 will have no inconvenient consequences. A further advantage is, that a neat and handy shape can be given to the rifle owing to the fact that the piston tube need not be placed exactly parallel to the barrel, but can have its fore end placed closely to the underside of the same.

As the powder gases, consisting largely of extremely hot steam, possess a faculty of producing rust on the steel surfaces, with which they get into contact, the gas chamber or tube is formed in two parts, viz. the outer rigid steel tube 40 and an inner thin tube 48, (Fig. 6) of rust-proof material, whereas the plunger itself is made of a rust-proof metal tube 41 with thick walls and having an inner core consisting of a steel rod 49 extending backward into the spiral coupling spring 43 far enough to engage the fore end of the piston rod 42 just before the spiral spring has been completely compressed, whereby the latter is protected from being damaged. Along the whole of its length the plunger is formed with circumferential grooves 50, whereby it need not be made to fit so tight as otherwise, without incurring inconvenient loss of gas, while at the same time the impurities that may penetrate to it will not be able to impede the ready movement of the plunger. The gas exit passage 37, between the threaded plug screw 35 of the gas tube and the rifle bore, has been bored in a rust-proof metal pin threaded into position.

Through the constructional arrangements above described the plunger will not have any tendency to clog and become wedged as would otherwise be the case, when somewhat neglectfully cleaned, and consequently there is no necessity of the soldiers tampering in any way with the gas passage, the gas tube or the plunger, which in fact must not be allowed.

The closing or locking spiral spring 39 as well as the plunger can be readily removed by detaching the guide bar 26, while said operation is not necessary for the removal of the piston rod itself.

The automatic loading mechanism works much faster than it is possible to release the trigger by the finger, and to prevent the firing of more than one shot for each pull at the trigger, means are employed to automatically release, immediately after firing a shot, the connection between the trigger hook proper and the trigger itself. The arrangement of the trigger mechanism is shown in Figs. 14, 15, 16 and 17.

The trigger mechanism comprises three parts, viz. the trigger body 53, the trigger 56 and the connecting member 60. The nose 51 at the front end of the trigger body is shaped so as to yield slightly and thereby better resist the stroke of the toe of the cock on the forward bouncing of the breech-bolt. The rear part 53 of the trigger body is formed of a resilient plate while the central part is provided with a slot 55 into which enters the head 57 of the trigger as well as the beveled head 64 of the connecting member 60. At the rear end of this slot 55 is formed a projection 59, serving as a support to a corresponding projection 58 at the back of the trigger head. At the front end of the slot 55 is formed an inclined plane 63, (Fig. 14) serving to induce the head 64 of the connecting member 60 to move laterally to the right. The trigger body 53 and the trigger 56 are connected by the resilient connecting member 60, which is secured to the trigger by a notched pin 61 entering a hole in the trigger, and enters the slot 55 of the trigger body. The resiliency of the connecting member 60 makes it always tend to press its head upward and forward, and in consequence of the before mentioned inclined plane 63 it will also be induced to move to the right side, whereby a notch 60ª in its head will engage and take a firm hold on the side of the trigger body, as shown in Figs. 14, 15 and 17. Normally the parts will always occupy this position and thus form a rigid connection.

The breech casing has at its rear left side a horizontal slot to receive the trigger body 53, (see Fig. 2 and dotted lines Fig. 1) which has at its under side a lug or projection 54 fitting in a corresponding groove in the hinge bolt 27 of the before-mentioned guide bar 26, so that when the latter is being inserted and secured into position, it at the same time also firmly clamps the rear part of the trigger body against the under side of the breech casing. It will thus be understood that on pulling the trigger, the head 57 will engage direct against the under side of the breech casing, while the connecting member 60 will draw the fore part of the trigger body, with the nose 51 downward and thereby release the toe of the striker in the usual manner. If the gas passages 36 and 37 are open, the piston rod head 44 will, directly on the departure of the shot, be thrown backward and thereby hit the beveled portion of the head 64 of the connecting member 60, thus pressing it inward, whereby it will loose its hold on the trigger body (see Fig. 16), which latter will then in consequence of the spring action of its rear part 53 instantly rebound and resume its original position ready to again arrest the toe of the striker on the forward bouncing of the breech-bolt. On releasing the trigger by the finger, the springiness of the connecting member 60 will, as the front wall of the slot 55 is not vertical, but inclining slightly forward, cause it to remount and resume its firm hold on the trigger body as already explained.

To limit the retrogressive movement of the breech-bolt, the guide slot 4 of the breech casing is at its rear end 13 (see Fig. 8) provided with a detachable stopping pin 11, (Fig. 1) which, as previously mentioned, possesses at its front side a strong buffer spring 14 to soften and absorb the stroke of the rear stopping lug 3 of the breech-bolt, while at its rear side it has a catch-spring 12 serving to keep it in place, and by means of which it can also be easily removed. In its top surface, the stopping pin 11 has a slot 15 (Fig. 13) into which enters the guide lug 10 of the cock or striker when the breech-bolt is in its rearmost position, the striker being thus maintained in its proper position and prevented from swerving.

The shell ejector is placed at the left under side of the breech casing. (Figs. 1, 3, 19 and 20) and has the form of a double spiral coil 66. By the particular shape is attained, first, that the ejector can be affixed without bolt or screw, second, that no further additional spring is necessary to cause the point of the ejector to spring up in front of the fore end of the breech-bolt, behind the bottom of the shell, when the breech-bolt is receding, and, third, that the ejector on the whole is more flexible and capable of resistance. As will be seen from Fig. 19, the double spiral-coil shaped ejector has at its front end a point or nose 98 for the ejection of the shell, and at its rear end an attaching arm 99, likewise pointing upward, and which serves to affix the ejector. This arm 99 normally inclines a little forward and at the front side of its upper end it is provided with a projection 100, which corresponds to a groove in the upper end of the hole bored in the breech casing to receive the ejector. The attachment of the ejector is consequently easily effected. By keeping the ejector crosswise to the longitudinal axis of the breech casing, inserting the end 99 into its hole in the breech casing, and on turning the fore part of the ejector forward and letting it slip into place, the aforementioned projection 100 will in consequence of the originally inclined position of the attaching arm 99 and in consequence of the springy action of the rear spiral coil enter into the corresponding groove in the upper end of the hole in the breech casing and thereby automatically secure the ejector in place. The rear spiral coil furthermore serves to press the fore point of the ejector up against the under side of the breech-bolt, in order that it may on the receding of the breech-bolt in the usual manner spring up in front of the latter, behind the bottom of the shell, while the foremost spiral coil has the object of rendering the otherwise too feeble fore part of the ejector, carrying the nose 98, sufficiently strong and capable of resistance.

In order to moderate the rapidity of the automatic loading operation, or to render it possible to insert the cartridges one by one by the left hand, thereby attaining a so-called semi-automatic loading operation, there has been disposed at the right side of the rear end of the breech casing, a stopping cock 67 for automatically arresting the breech-bolt in its rearmost position (see Figs. 7, 8 and 11). This stopping cock is influenced by a small spiral spring 68ª disposed at its hollow under side and is, along with said spring, pivotally mounted on a bolt sufficiently long to allow the cock to be pushed a little backward or forward so as to bring it into or out of operation. In the position shown in Fig. 8 the stopping cock is brought out of operation, having been in its depressed position pushed forward so as to bring its inclined front lug 69 into a notch 23 in the breech casing, whereby it is maintained in this position. If, however, said stopping cock 67 is being drawn a little rearward, then the inclined front lug 69 will be released from the notch 23, and consequently the spiral spring 68ª will cause the stopping cock to spring up, with the effect that its inclined nose 68 will protrude into the path of the breech-bolt stopping lugs in the slot 4 of the breech casing. As the nose 68 has a surface inclining forward, it will, during the backward movement of the breech-bolt be pushed aside by the stopping lug 3 of the latter, but as soon as the lug 3 has passed, the spiral spring of the stopping cock will cause its nose to project before the front side of the lug 3, thereby arresting the breech-bolt in its rearmost position, until again released by a finger pressure on the stopping cock.

To secure the cock or striker in its cocked position and at the same time to secure the breech-bolt in its locked position, the rifle is provided with a safety device the shape and placement of which may be seen from Figs. 2, 7, 8 and 10. It has the form of a bolt 70, provided with a wing 70ª and placed longitudinally in a corresponding bore at the right hand side of the breech casing. This bolt further is provided with a helical lug 71, which moves in a corresponding helical slot 22 in the breech casing so that, when the wing of the bolt 70 is turned upward, the nose of the said helical lug 71 will intrude into the interior of the breech casing just in front of the fore side of the head of the striker, whereby the striker is prevented from springing forward, even when the trigger is pulled. Further the bolt 70 will, when the wing is turned upward, in consequence of the helical shape of its lug 71 be induced to move a little forward, so that its fore point 72 will enter into the lateral recess 8 which forms a termination of the slot a and consequently, when the breech-bolt is in its locked position, intrude into a hole 73 (Fig. 2) of the bolt lever handle 7, whereby the breech-bolt is thus secured in its closed or locked position.

The rear end of the breech-casing A is forked (Figs. 1 and 8) the ends of said fork being formed with hooks 24 which take under the semi-cylindrical cross-head 74 of a fixed stock-bolt 74ª and the forward end of said casing is provided with an internally threaded socket A' into which the threaded rear end of the barrel C is screwed. The barrel is secured to the forward end of the stock B by means of a band or hoop 34 (Fig. 9) which has a catch-bolt 75 actuated by a spiral spring 75ª, the inclined rear end 76 of said bolt entering a correspondingly shaped recess formed in a steel shoe 77 mounted on the fore end of said stock. A further fastening of the parts is effected by means of a bolt 78 rotatably mounted in the fore part of the trigger guard-plate D which is secured at its rear end by the fixed stock-bolt 74ª and at its forward end by means of a screw b. The bolt 78 is rotatably held in the plate D by means of a lug d, on said plate, taking into a groove 78ª formed in the periphery of the head of the bolt. The shank of said bolt 78 is provided with a cross head 78ᵇ which projects through a longitudinally arranged slot formed in the forward end of the guide-plate 26, which latter is secured to the casing by means of the spring arms 30 as previously described and when the wing 78ᶜ of the bolt is turned to lie under the stock the cross head will lie across the longitudinal slot as shown in Fig. 4 and lock the guide-plate and stock together. The end of screw b engages the wing and holds it against accidental displacement.

The attachment of the magazine is brought about by means of outwardly slotted vertical borings 79 and 80 (Fig. 8) at the right hand side of the breech casing in coöperation with hooks 84 and 85 of the bar 83 (Figs. 7 and 18) sunk into the right side of the fore end of the butt. Another type of magazine may be fastened by means of a nose 82, Fig. 1ª of the wing of the fastening bolt 78 in coöperation with a notch 81 Fig. 1 at the front side of the trigger guard plate D.

To enlarge to the greatest possible extent the cooling effect necessary especially during protracted and quick firing, the rifle barrel is formed externally with comparatively high, longitudinal ribs 87, Figs. 1ª and 9 whereas the foremost portion of the stock B as well as the hand-guard wooden cover between sight and breech casing, are perforated to diminish the insulating effect of same, (Fig. 7). The rear portion of the barrel covered by these wooden parts is provided with circumferential grooves, so that the remaining portions of the longitudinal ribs get the form of truncated pyramids 90 (see Figs. 1ª, 5 and 9) around which the air can circulate freely.

To facilitate the conveyance of the rifle during the march and especially when the soldier is creeping along the ground, a pivoted shackle 86 has been secured either to the base of the rear sight, as shown in Fig. 9, or to the rifle barrel direct, which shackle is adapted for being hooked to a corresponding hook provided at the front of the soldier's shoulder. What is here aimed at and attained, is, first, that the soldier may have both hands free, during the march as well as when creeping along the ground, so that this latter mode of movement is rendered much more convenient than is otherwise the case and without risking the mechanism or magazine, and, second, that by the shackle the rifle is prevented from tipping over and from turning the mechanism downward, thereby exposing it to damage as on the contrary the rifle is by the shackle always maintained in an upright position, only with the mounting 97 of the stock (Fig. 7) trailing on the ground.

As previously stated, the present invention renders it possible to use the rifle: 1. as an entirely automatically operating rifle, cartridges being provided from magazines; 2. as a semi-automatic rifle, cartridges being inserted by hand, and 3. as an ordinary hand-manipulated rifle, with or without magazines, the breech-bolt being manipulated by hand by its fixed knob lever as usual.

Figure 3:
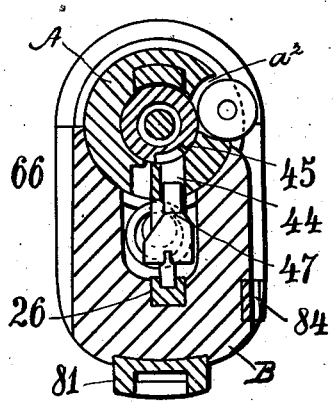

When the cartridges are supplied from magazines, the first cartridge will, under the pressure of the cartridges following, rest in a correspondingly grooved slot $a^2$ at the right hand side of the breech casing, as will be seen from Figs. 3 and 8. This slot serves as a support for the rear portion of the cartridge and is just wide enough to allow the bottom end of the cartridge to intrude a little into the path of the breech-bolt in the breech casing in the moment the breech-bolt is in its retired position. When the breech-bolt is again advancing, the right side of its front end will abut against the left side of the bottom of the cartridge and thus push it forward and into the cartridge chamber of the barrel, whereupon the next cartridge will take its place in the exterior side slot mentioned.

When the rifle is desired to operate automatically, the screw plug 35 at the front end of the piston tube is turned so as to open the gas passage between the barrel and the piston tube. Upon the departure of the shot, part of the powder gases will enter the piston tube and throw the piston rearward in the manner previously described, and consequently the piston-rod head will mount the inclined plane 29 of its guide slot with the effect that its top lug 45 will enter into the recessed portion of the breech bolt, engage against the inclined opening surface 16, thereby turn the breech-bolt open, subsequently abut with its buffer spring 47 against the front side of the rear stopping lug 3 of the breech-bolt and thereby throw the latter rearward during which the empty shell will have been extracted in the usual way and expulged by abutting against the top 98 of the ejector 66. The breech-bolt, having reached its rearmost position, it will at once move forward again, first in consequence of the reaction of the strong buffer spring 14 of the stopping pin 11, and secondly by the influence of the piston, which is aided in the forward direction by the reaction of its strong locking spiral spring 39. The top lug 45 of the piston rod head 44 will thus engage against the rear curved end of the closing surface 18 (see Fig. 12) of the breech-bolt, thereby taking it farther forward and finally turning and locking it in the manner previously described, whereupon the piston rod head 44 will, in consequence of the inclined plane 19 limiting in front the side recess of the breech-bolt and in consequence of the inclined plane 46 of the front side of the piston-head itself, again automatically be pressed down into and resume its lowered position in the recess 28 of the guide slot 25, thus resting entirely out of the path of the breech-bolt and leaving it entirely free for eventual hand manipulation. During the rearward movement of the piston it will, as previously explained, have released the connection between the trigger hook body and the trigger, so as to allow the former to instantly rebound and arrest the striker anew. As soon as the trigger has been released by the finger, it will automatically resume its fixed connection with the trigger hook body, and the fresh cartridge inserted during the forward movement of the breech-bolt can be fired by pulling the trigger anew.

When the rifle is desired to operate semi-automatically, the stopping cock 67 is pulled a little rearward, whereby it is given free play and will by its nose 68 intrude into the path of the stopping lug 3 of the breech-bolt and arrest the latter in its rearmost position for each round. Cartridges may thus be inserted by the left hand one by one, the breech-bolt locking itself automatically when released by a thumb pull at the stopping cock 67.

When the rifle is desired to be used as an ordinary hand-operated arm, the screw plug 35 at the front end of the gas tube is turned a little so as to cut off the gas admission passage 37. Consequently no gas will enter the piston tube, the piston will remain in its position of rest, and the breech-bolt is left entirely free to be operated direct by hand by means of its lever 7, precisely as the present military rifles, the soldier being at liberty to use magazine feeding or to insert cartridges by hand one by one.

I claim:—

1. In a rifle, the combination with the barrel and a gas receiving chamber communicating therewith, of a breech-bolt having an opening surface thereon, a piston-rod reciprocably mounted in the chamber having a head adapted to engage said surface and operate the bolt and means to automatically move said head into and out of engagement with the surface.

2. In a rifle, the combination with the barrel and a gas receiving chamber communicating therewith, of a breech-bolt having an opening surface and a closing surface thereon, a piston-rod reciprocably mounted in the chamber having a head adapted to engage said surfaces and operate the bolt, a guide for said head having a depression wherein the latter will normally lie out of contact with said surfaces and means to automatically move said head into and out of engagement with the surfaces.

3. In a rifle, the combination with the barrel and a gas receiving chamber communicating therewith, of a breech-bolt having an opening surface and a closing surface thereon, a piston-rod reciprocably mounted in the chamber having a head adapted to engage said surfaces and operate the bolt, a guide for said head having a depression wherein the latter will normally lie out of contact with said surfaces and inclines on said guide adapted to move the head into engagement with the bolt.

4. In a rifle, the combination with the barrel and a gas receiving chamber communicating therewith, of a breech-bolt having an opening surface and a closing surface thereon, a piston-rod reciprocably mounted in the chamber having a head adapted to engage said surfaces and operate the bolt, a guide for said head having a depression wherein the latter will normally lie out of contact with said surfaces, inclines on said guide adapted to move the head into engagement with the bolt, and an incline on said head adapted to move the latter out of engagement with the bolt.

5. In a rifle, the combination with the barrel and a gas receiving chamber communicating therewith, of a breech casing communicating with the chamber, a breech-bolt mounted in the casing and having an opening surface and a closing surface thereon, a piston-rod reciprocably mounted in the chamber having a head provided with a lug thereon, means to raise said head into the casing to cause the lug to engage said surfaces and means to move said lug out of the casing.

6. In a rifle, the combination with the barrel and a gas receiving chamber communicating therewith, of a breech casing communicating with the chamber, a breech-bolt mounted in the casing, a piston rod, means for reciprocating the latter, means to raise the head of the rod into the casing at the beginning of its rearward stroke and means to move said head out of the casing at the end of its forward stroke.

7. In a rifle, the combination with the barrel and a gas receiving chamber communicating therewith, of a breech casing communicating with the chamber, a breech-bolt mounted in the casing and having an opening surface and a closing surface thereon, a piston-rod reciprocably mounted in the chamber provided with a head having a lug thereon, a recess to receive the head, an incline at the rear end of the recess to raise the head at the beginning of its rearward stroke, and an incline on the head to depress the latter at the end of the forward stroke.

8. In a rifle, the combination with a breech-casing, a breech-bolt therein, and a piston head for operating the same, of a guide-bar for the piston head, a cross pin connecting the bar at its rear end to the casing, a trigger having a resilient portion clamped between the pin and breech casing, elastic arms on the fore part of said bar adapted to engage slots in the breech-casing, and a gas tube supported at one end by said guide-bar.

9. In a rifle, the combination with the barrel, a gas receiving chamber communicating therewith, a breech-casing, and a breech-bolt mounted in the latter, of a lug on the breech-bolt, a piston rod adapted to actuate said bolt, and a buffer spring mounted on the head of the piston-rod adapted to engage said lug.

10. In a rifle, the combination with a breech casing, a breech-bolt reciprocable therein, and means to throw the bolt to the rear of the casing, of a stopping pin detachably mounted in the rear of the casing, a buffer spring mounted in front of the pin to engage a lug on the breech-bolt when the latter is thrown backward, and a striker carried by the breech-bolt guided in a slot on the stopping pin.

11. In a rifle, the combination with a breech casing, a reciprocable breech-bolt mounted therein and a gas-operated piston-head adapted to actuate the bolt, of a resilient trigger member fixed at one end, a trigger, a resilient member fixed to the trigger and having a beveled head projecting into a slot in the resilient member and normally connected thereto, said head adapted to be engaged by the piston-head.

12. In a rifle, the combination with a breech casing and a breech-bolt therein, of a shell ejector comprising a rear coil having an arm projecting into a notch in the casing and a front coil having an arm projecting in front of the breech-bolt.

13. In a rifle, the combination of breech-casing and a shell ejector comprising a piece of spring metal having a coil formed near each end, the free end of one coil engaging a notch in the casing and the free end of the other coil projecting into the casing.

14. In a rifle, the combination with a breech-casing, and a breech-bolt reciprocable therein, of a stopping cock pivoted in the casing and having an inclined rear lug adapted to project into the path of the rear lug on the breech bolt, and a forward lug adapted to engage an inclined notch on the casing to hold the rear lug out of the path of the bolt lug.

15. In a rifle, the combination with a breech casing and a breech-bolt reciprocable therein and provided with an actuating lever, of a safety device comprising a bolt pivotally and slidably mounted in the casing and provided with a helical lug projecting into a corresponding slot in the casing, a wing formed on the bolt for rotating the latter, the end of said bolt adapted to take into a recess formed in the bolt lever.

16. In a rifle, the combination with the barrel and a gas tube communicating therewith, of a plunger and a piston rod mounted in the tube, a head on the rod projecting beyond the tube, a helical spring connecting the plunger and rod, and a spiral spring surrounding the gas tube secured to said head and adapted to retract the latter against the force of the gases.

17. In a rifle, the combination of a gas receiving chamber, a plunger mounted therein comprising a tube having circumferential grooves and a steel core projecting beyond the tube, a helical spring surrounding the core and projecting beyond the end thereof, a piston rod secured to the projecting end of the spring and extending beyond the chamber, a head on the piston-rod, and a coiled spring fixed at one end and surrounding the chamber and having its other end secured to the piston head.

18. In a rifle, the combination with the barrel, a stock, a gas tube communicating with the barrel, a plunger in the tube, a piston-rod connected with the plunger, a guide-bar for the rod, a breech casing and a breech-bolt therein operable by the piston-rod, of a pin projecting through the butt of the stock having a head thereon to engage hooks formed on the rear end of the breech-casing, a coupling-member surrounding the barrel and gas-tube, a spring urged pin mounted in the coupling member, a shoe on the fore end of the stock to receive the pin, and a winged bolt pivoted in the stock having a cross-head engaging the guide-bar.

In testimony that I claim the foregoing as my invention, I have signed my name in presence of two subscribing witnesses.

HARALD SUNNGÅRD.

Witnesses:
 JOH VAALER,
 HENRY BORDEWICH.